UNITED STATES PATENT OFFICE.

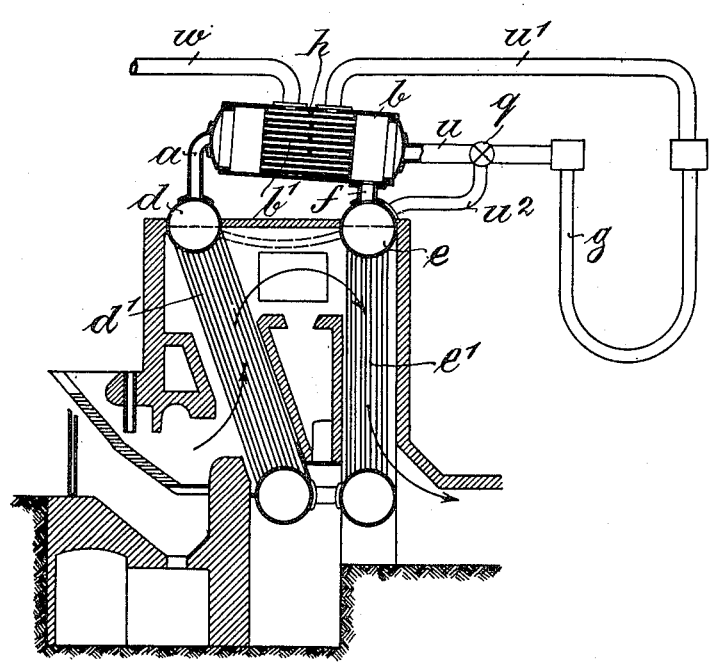

LEBRECHT STEINMÜLLER, OF GUMMERSBACH, GERMANY.

STEAM-GENERATOR.

1,069,631.     Specification of Letters Patent.     Patented Aug. 5, 1913.

Application filed September 27, 1912.   Serial No. 722,769.

*To all whom it may concern:*

Be it known that I, LEBRECHT STEINMÜLLER, subject of the King of Prussia, residing at Gummersbach, in the Province of the Rhine, German Empire, have invented certain new and useful Improvements in Steam-Generators, of which the following is a specification.

This invention relates to steam generators of the type described in the specification of my prior United States patent application Serial No. 651,599, filed September 27th, 1911, and the object of the present invention is to enable the intermediate heater described in my aforesaid patent specification to be used in conjunction with steam generators having two or more boiler elements which are heated to different temperatures, and particularly of the kind in which the boiler elements comprise inclined and more or less vertical water tubes.

According to the present invention the intermediate heater is arranged between the upper drums of the water tube elements in such a manner that the wettest saturated steam generated in the most highly heated boiler element passes entirely through the heater and is dried or superheated therein, while the drier saturated steam generated in the less highly heated boiler element or elements is either not passed through the heater at all, or only caused to pass through part of the heater. By this means, when heavy work is put upon the boiler, in which case the degree of superheating is considerably increased, chiefly wet steam will be caused to enter the heater from the most highly heated boiler element, and thus more heat will be taken from the superheated steam passing through and heating up the heater, so that in this manner, within certain limits, the temperature of the superheated steam will be automatically regulated. Furthermore, only that steam passes through the heater which is most effective in the exchange of heat therein, that is to say, the supersaturated steam, so that the heater may be made smaller and radiation and pressure losses in the heater will be consequently less than if the whole of the steam generated by the steam generator is caused to pass through the heater. A considerable reduction in the loss due to radiation is also more particularly obtained by being able to dispense with the usual steam collector necessary in inclined water tube boilers owing to the high degree of wetness of the steam, as the heater in the present case acts as a steam collector. If violent ebullition cannot be prevented in the upper water drum of the most highly heated element, which results in the generation of very wet steam, the steam generated therein, when no longer supplied to the upper drum of the less highly heated element, will insure quieter ebullition in the upper drum of the most highly heated element and in consequence thereof, drier steam will be generated.

In most cases the excess heat in the superheated steam passing through the heater will be sufficient to vaporize the whole of the water contained in the saturated steam, but if this is not the case, part of the water can be separated and returned to the boiler.

In order that the invention may be more clearly understood, reference is made to the accompanying drawings, which show, more or less diagrammatically, the application of my invention to one type of water tube steam generator.

In the drawings the intermediate heater $b$ is arranged above and between the upper water drums $d$ and $e$ of the water tube elements $d'$ $e'$ respectively, the heater $b$ being connected to the water drum $d$ by way of a pipe $a$ and to the water-drum $e$ through a connection $f$. A pipe $u$ connects the heater $b$ with the superheater $g$ which in this case is shown outside the boiler for the sake of clearness. The superheater is connected by a return pipe $u'$ to the heater $b$ in the manner described in my aforesaid patent specification, the said heater comprising tubes $b'$ through which the wet steam passes, while the superheated steam entering the heater by way of the pipe $u'$ passes around the tubes $b'$ and around a baffle plate $h$ to the steam supply pipe $w$.

The particularly wet steam generated in the upper drum $d$ passes by way of the pipe $a$ into the heater $b$ and through the tubes $b'$, which are heated by the superheated steam, so that the wet steam will be dried in these tubes. The steam thereupon mixes with the dry steam coming from the upper drum $e$ whereupon the mixture passes through the tube $u$ to the superheater $g$ and from thence through the return tube $u'$ to and around the tubes $b'$; where the temperature of the now superheated steam is slightly diminished previous to passing away by way of the pipe $w$.

Should more water enter the heater $b$ than can be vaporized therein, the excess water can flow through the connection $f$ into the upper drum $e$ and there be vaporized.

If desired the upper drum $e$ may be connected to the pipe $u$ through a pipe $u^2$ and a three-way valve $q$ may be arranged at the junction of the pipes so that the pipes $u$ and $u^2$ may be either independently or simultaneously put into communication with the superheater $g$. When only the pipe $u^2$ is in communication with the superheater $g$ through the valve $q$, the whole of the steam dried and slightly superheated in the heater $b$ will first of all pass through the upper drum $e$ where it will be cooled and again moistened before passing to the superheater.

By regulating the passage of the steam to the superheater in this manner, it is possible to prevent any burning out of the superheater tubes even if heavy work is put upon the boiler inasmuch as the whole of the steam can be passed through the superheater in moist condition and at the temperature of saturation, so that the temperature of the superheated steam may be reduced without loss.

It will of course be understood that the invention can also be applied to steam generators having more than two upper drums by conducting the generated steam through a larger or smaller part of the heater according to its degree of wetness.

I claim:—

1. The combination with a steam generator having a plurality of water tube elements heated by gases of different temperature and connected to separate upper water drums, and a superheater; of a heater heated by the superheated steam from said superheater and connected to said water drums in such a manner that the wetter steam generated in the more highly heated water tube elements passes through a larger part of said heater than the drier steam generated in the less highly heated water tube elements.

2. The combination with a steam generator having a plurality of water tube elements heated by gases of different temperature and connected to separate upper water drums, and a superheater; of a heater heated by the superheated steam from said superheater and connected to said drums in such a manner that the wettest steam generated in the most highly heated water tube element passes through the entire heater while the driest steam generated in the least highly heated water tube element passes direct to said superheater.

3. The combination with a steam generator having a plurality of water tube elements heated by gases of different temperature and connected to separate upper water drums, and a superheater; of a heater heated by the superheated steam from said superheater and connected to said water drums in such a manner that the wetter steam generated in the more highly heated water tube elements passes through a larger part of said heater than the drier steam generated in the less highly heated water tube elements and a connection between the water drum of the least highly heated element and said superheater.

4. The combination with a steam generator having a plurality of water tube elements heated by gases of different temperature and connected to separate upper water drums, and a superheater; of a heater heated by the superheated steam from said superheater and connected to said superheater and to said drums in such a manner that the wettest steam generated in the most highly heated water tube element passes through the entire heater while the driest steam generated in the least highly heated water tube element passes direct to said superheater.

5. The combination with a steam generator having a plurality of water tube elements heated by gases of different temperature and connected to separate upper water drums, and a superheater; of a heater heated by the superheated steam from said superheater and connected to said water drums in such a manner that the wetter steam generated in the more highly heated water tube element passes through a larger part of said heater than the drier steam generated in the less highly heated water tube elements, a connection between the water drum of the least highly heated element and said superheater, and valve means for controlling communication between said superheater and the water drum of the least highly heated element.

6. The combination with a steam generator having a plurality of water tube elements heated by gases of different temperature and connected to separate upper water drums, and a superheater; of a heater heated by the superheated steam from said superheater and connected to said drums and superheater in such a manner that the wettest steam generated in the most highly heated water tube element passes through the entire heater, while the driest steam generated in the least highly heated water tube element passes direct to said superheater, and valve means for controlling communication between said superheater and heater and between said superheater and the water drum of the least highly heated element.

7. The combination with a steam generator having a plurality of water tube elements connected to upper water drums, and a superheater; of a heater heated by the superheated steam from said superheater and connected to said water drums in such a manner that the wetter steam passes through a larger part of said heater than the drier steam, said heater being declined toward the coolest water drum so as to be capable of discharging water thereinto.

8. The combination with a steam generator having a plurality of water tube elements connected to upper water drums, and a superheater; of a heater heated by the superheated steam from said superheater and connected to said drums in such a manner that the wettest steam passes through the entire heater while the driest steam passes direct to said superheater, said heater being declined toward the coolest water drum so as to be capable of discharging water thereinto.

9. The combination with a steam generator having a plurality of water tube elements connected to upper water drums, and a superheater; of a heater comprising a heating space and a drying space, the drying space being connected to said drums in such a manner that the wetter steam passes through a larger part of said drying space than the drier steam, and a connection from said superheater to said heating space.

10. The combination with a steam generator having a plurality of water tube elements connected to upper water drums, and a superheater; of a heater comprising a heating space and a drying space, the drying space being connected to said drums in such a manner that the wettest steam passes entirely through said drying space, a connection between the coolest drum and said superheater and a connection from said superheater to said heating space.

11. The combination with a steam generator having a plurality of water tube elements connected to upper water drums, and a superheater; of a heater comprising a heating space and a drying space, the drying space being connected to said superheater and to said drums in such a manner that the wetter steam passes through a larger part of said drying space than the drier steam, a connection from said superheater to said heating space, and valve means for controlling communication between said superheater and drying space and between said superheater and coolest water drum.

12. The combination with a steam generator having a plurality of water tube elements connected to upper water drums, and a superheater; of a heater comprising a heating space and a drying space, the drying space being connected to said superheater and to said drums in such a manner that the wettest steam passes entirely through said drying space, a connection between the coolest drum and said superheater, a connection from said superheater to said heating space, and valve means for controlling communication between said superheater and drying space and between said superheater and coolest water drum.

13. The combination with a steam generator having a plurality of water tube elements connected to upper water drums, and a superheater; of a heater comprising a heating space and a drying space, the drying space being connected to said drums in such a manner that the wetter steam passes through a larger part of said drying space than the drier steam and being declined toward the coolest water drum so as to be capable of discharging water thereinto, and a connection from said superheater to said heating space.

14. The combination with a steam generator having a plurality of water tube elements connected to upper water drums, and a superheater; of a heater comprising a heating space and a drying space, the drying space being connected to said drums in such a manner that the wettest steam passes entirely through said drying space, and being declined toward the coolest water drum so as to be capable of discharging water thereinto, a connection between the coolest drum and said superheater, and a connection from said superheater to said heating space.

15. In combination, water tube elements connected to two upper water drums, a heater comprising a heating space and a drying space, the drying space being connected at one end to the hotter water drum and at the other end to the cooler water drum, a superheater and a connection from said cooler water drum to said superheater.

16. In combination, water tube elements connected to two upper water drums, a heater comprising a heating space and a drying space, the drying space being connected at one end to the hotter water drum and at the other end to the cooler water drum, a superheater, a connection from said cooler water drum to said superheater, a connection from said superheater to said heating space, and valve means for controlling communication between said superheater and cooler water drum.

17. In combination, water tube elements connected to two upper water drums, a heater comprising a heating space and a drying space, the drying space being connected at one end to the hotter water drum and at the other end to the cooler water drum and being declined toward the cooler water drum, a superheater and a connection from said cooler water drum to said superheater.

In witness whereof I have hereunto set my hand in the presence of two witnesses.

LEBRECHT STEINMÜLLER.

Witnesses:
 WOLDEMAR HAUPT,
 HENRY HASPER.